(12) United States Patent
Yao et al.

(10) Patent No.: US 10,110,070 B2
(45) Date of Patent: Oct. 23, 2018

(54) WIRELESS POWER TRANSMITTER WITH ARRAY OF TRANSMIT COILS

(71) Applicant: Intel Corporation, Santa Clara, CA (US)

(72) Inventors: Zhen Yao, San Jose, CA (US); Songnan Yang, San Jose, CA (US); Essam Elkhouly, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 15/089,113

(22) Filed: Apr. 1, 2016

(65) Prior Publication Data

US 2017/0288460 A1    Oct. 5, 2017

(51) Int. Cl.
| | |
|---|---|
| *H01F 27/42* | (2006.01) |
| *H01F 37/00* | (2006.01) |
| *H01F 38/00* | (2006.01) |
| *H02J 50/12* | (2016.01) |
| *H02J 50/60* | (2016.01) |
| *H02J 7/02* | (2016.01) |

(52) U.S. Cl.
CPC ............. *H02J 50/12* (2016.02); *H02J 7/025* (2013.01); *H02J 50/60* (2016.02)

(58) Field of Classification Search
USPC ....................................................... 307/104
See application file for complete search history.

(56) References Cited

U.S. PATENT DOCUMENTS

| | | | |
|---|---|---|---|
| 2010/0259217 A1 | 10/2010 | Baarman et al. | |
| 2013/0002038 A1* | 1/2013 | Lee ............ | H02J 7/00 307/104 |
| 2013/0221758 A1* | 8/2013 | Kai ........... | H02J 5/005 307/104 |
| 2014/0009109 A1* | 1/2014 | Lee ........... | H02J 17/00 320/108 |
| 2014/0042820 A1 | 2/2014 | Park et al. | |
| 2014/0239736 A1* | 8/2014 | Kai ........... | B60L 11/182 307/104 |

(Continued)

FOREIGN PATENT DOCUMENTS

| | | |
|---|---|---|
| JP | 2009164293 A | 7/2009 |
| JP | 2012175806 A | 9/2012 |
| WO | 2016005984 A1 | 1/2016 |

OTHER PUBLICATIONS

PCT International Search Report, International Application No. PCT/US2017/015734, date of completion Apr. 26, 2017, 3 pages.

*Primary Examiner* — Adam Houston
(74) *Attorney, Agent, or Firm* — International IP Law Group, P.L.L.C.

(57) ABSTRACT

Techniques for wireless transmitting power are described. An example power transmitting unit includes a magnetic resonance-type transmit coil array comprising a plurality of coil elements, wherein each coil element is tuned to a same resonant frequency. The power transmitting unit also includes a power generating circuitry to deliver current to the transmit coil array to wirelessly power a device within an active wireless charging area of at least one of the plurality of coil elements. Each coil element exhibits a plurality of zero point distances and the spacing between neighboring coil elements corresponds with the plurality of zero point distances.

25 Claims, 9 Drawing Sheets

(56) References Cited

U.S. PATENT DOCUMENTS

| | | | | |
|---|---|---|---|---|
| 2014/0361739 A1* | 12/2014 | Kwak | ........................ | H02J 5/005 |
| | | | | 320/108 |
| 2014/0368053 A1* | 12/2014 | Lee | ........................ | H01F 38/14 |
| | | | | 307/104 |
| 2015/0008756 A1* | 1/2015 | Lee | ........................ | H02J 17/00 |
| | | | | 307/104 |
| 2015/0008876 A1* | 1/2015 | Kwak | ........................ | H02J 7/025 |
| | | | | 320/108 |
| 2015/0054347 A1* | 2/2015 | Amano | ........................ | H04B 5/0087 |
| | | | | 307/104 |
| 2015/0054351 A1* | 2/2015 | Deguchi | ........................ | H01F 38/14 |
| | | | | 307/104 |
| 2015/0130409 A1* | 5/2015 | Lee | ........................ | H02J 17/00 |
| | | | | 320/108 |
| 2015/0137746 A1* | 5/2015 | Lee | ........................ | H02J 5/005 |
| | | | | 320/108 |
| 2015/0288196 A1* | 10/2015 | Park | ........................ | H02J 5/005 |
| | | | | 307/104 |
| 2016/0001663 A1* | 1/2016 | Chae | ........................ | B60L 1/006 |
| | | | | 307/9.1 |
| 2016/0064994 A1* | 3/2016 | Ku | ........................ | H02J 7/025 |
| | | | | 307/104 |
| 2016/0134334 A1* | 5/2016 | Park | ........................ | H02J 5/005 |
| | | | | 307/104 |
| 2016/0141884 A1* | 5/2016 | Lee | ........................ | H02J 17/00 |
| | | | | 307/104 |
| 2016/0164332 A1* | 6/2016 | Elkhouly | ........................ | H02J 50/12 |
| | | | | 320/108 |
| 2016/0282500 A1* | 9/2016 | Filippenko | ........................ | G01V 3/104 |
| 2017/0288460 A1* | 10/2017 | Yao | ........................ | H02J 50/12 |

\* cited by examiner

200

202

500

800

900

WIRELESS POWER TRANSMITTER WITH ARRAY OF TRANSMIT COILS

TECHNICAL FIELD

This disclosure relates generally to techniques for wireless charging. Specifically, this disclosure relates to a wireless charging transmitter with multiple transmit coils.

BACKGROUND

A wireless power transfer system may include a wireless power transmitter unit (PTU) and a wireless power receiving unit (PRU). A PRU may be implemented in a mobile computing device, such as a laptop, tablet or smart phone, which can be placed on a charging mat equipped with a PTU. The PTU may include a transmit (Tx) coil and the PRU may include a receive (Rx) coil. In typical wireless power transfer systems, the transmit coil creates an alternating electromagnetic field and the receive coil takes power from the electromagnetic field and converts it back into electrical current to charge the battery and/or power the device.

Inductive charging and magnetic resonance charging are two techniques for wireless power transfer. In inductive charging, the transmit and receive coils are tightly coupled and operate like two windings of a transformer. Most of the energy transfer is via non-radiative near-field electromagnetic waves. In inductive charging, power can be wirelessly transferred over a large range of frequencies, and the resonant frequency at which power is transferred is based on the load impedance.

In magnetic resonance charging, the transmit and receive coils are loosely coupled, which enables a single transmit coil to be used to transmit power to two or more receive coils. The energy transfer in magnetic resonance charging can occur via radiative far-field electromagnetic waves. Unlike inductive charging, the transmit and receive coils used in magnetic resonance charging are tuned to the same resonant frequency to improve the energy transfer efficiency.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for creating a wireless power transfer device with multiple transmit coils. More specifically, the present disclosure provides a magnetic resonance-type wireless power transfer device that uses a tiled transmit coil array. Many wireless charging systems fall into one of two categories, inductive charging and magnetic resonance charging. In most magnetic resonance-type wireless charging systems, a single large coil is used to achieve a large active area to support positional flexibility and one-to-many charging.

Various benefits can be obtained by using a tiled coil array of several smaller transmit coils to cover the same area as a single large transmit coil. Individual transmit coils of the coil array can be selectively powered to limit the unintended illumination of empty charging area, which provides greater efficiency and reduces excess radio frequency radiation. In inductive charging systems, the transmit coils are not tuned to the same resonant frequency and therefore have a very low level of mutual coupling between the adjacent coil elements. Thus, an array of transmit coils can be easily deployed in an inductive charging system.

However, in magnetic resonance-type systems the transmit coils are tuned to the same resonant frequency. Thus, the closely spaced resonant transmit coils have a relatively high degree of mutual coupling. Unlike a non-resonant coil array used in inductive solutions, where each coil element can be treated as an independent coil, once each coil element is tuned to resonance, the mutual coupling between the tuned coil elements makes each coil act like a field repeater for the several coils around them, which in turn makes the system implementation almost impossible. The wireless power transfer device described herein uses an array of transmit coils that are designed to reduce the mutual coupling between closely spaced coils.

The techniques described herein may be implemented in part using a wireless charging standard protocol, such as a specification provided by Alliance For Wireless Power (A4WP) now AirFuel Alliance, Wireless Power Consortium (WPC), and others. However, the techniques described herein may be implemented using any other wireless charging standard protocol where applicable.

Figure 1:
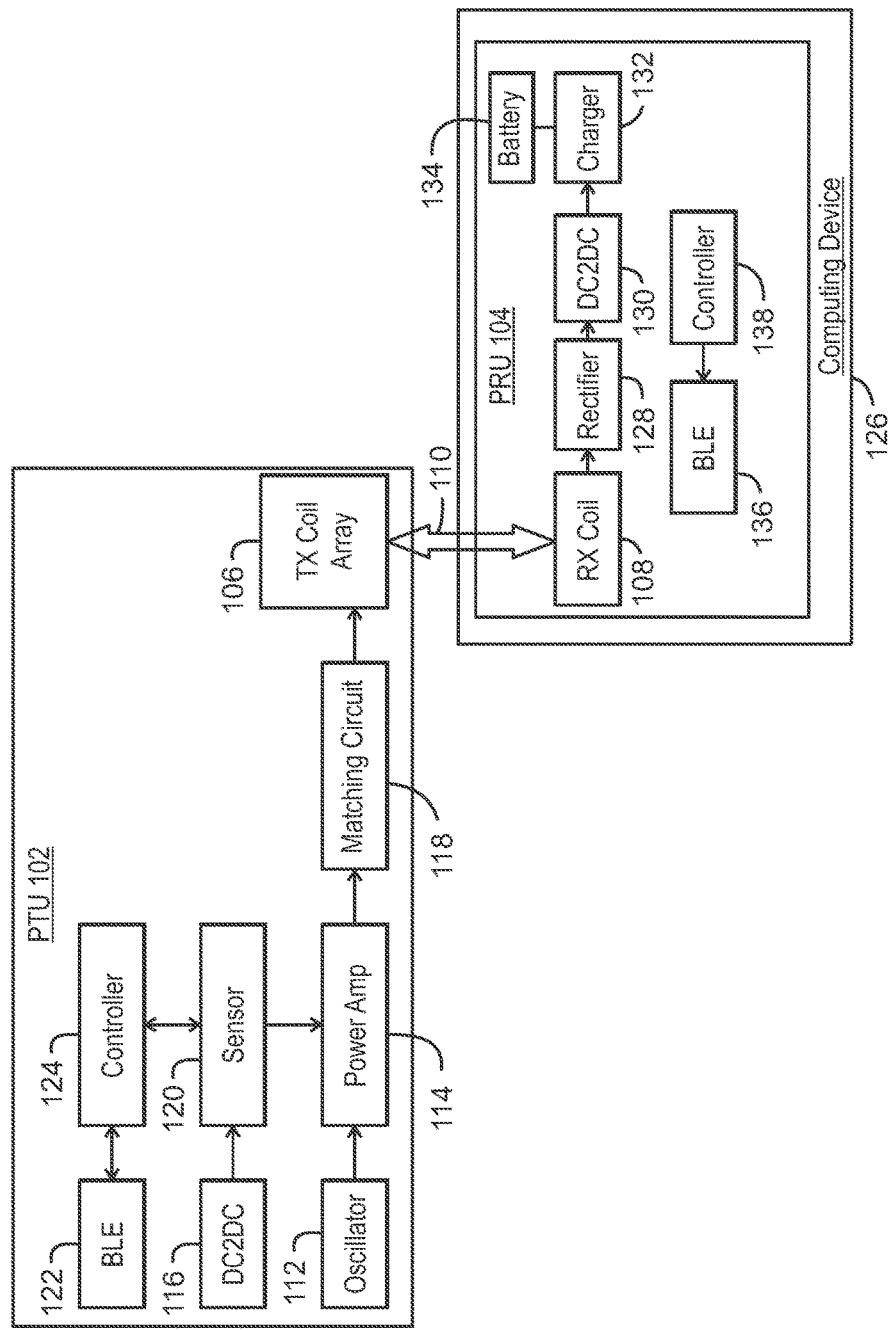
FIG. 1 is block diagram of a PTU to provide power to a PRU.

FIG. 1 is block diagram of a PTU to provide power to a PRU. The PTU 102 is configured to wirelessly transmit power from the transmit coil array 106 of the PTU 102 to the receive coil 108 of the PRU 104 as indicated by the arrow 110. The transmit coil array includes a plurality of transmit coils arranged in a tiled fashion as described further below. The PTU 102 may be a magnetic resonance-type wireless power transmitter, in which case each coil in the transmit coil array 106 is tuned to the same resonant frequency as the receive coil 108. Also, in magnetic resonance-type wireless power transmission, the transmit coil array transmits power at a single resonant frequency.

The PTU 102 may include an oscillator 112, a power amplifier 114, a Direct Current to Direct Current (DC2DC) converter 116, and a matching circuit 118. The oscillator 112 is configured to generate a periodic oscillating electronic signal at a specified frequency. The power amplifier 114 receives direct current power from the DC2DC converter 116, and amplifies the signal received from the oscillator 112. The matching circuit 118 matches the impedance of the power amplifier 114 to the impedance of the transmit coil array 106 to ensure efficient power transmission. The matching circuit 118 may include any suitable arrangement of electrical components such as capacitors, inductors, and other circuit elements that can be adjusted to impedance match the transmit coil array 106 to the power amplifier 114.

In some examples, there is a switching network (not shown) between the matching circuit and the transmit coil array 106. This switching network enables one or more of the transmit coils in the transmit coil array 106 to be activated. In this way, individual transmit coils of the transmit coil array 106 can be activated and deactivated independently of one another. Various circuit architectures may be used to enable individual control of the transmit coils in the transmit coil array 106.

Other components of the PTU 102 may include a current sensor 120, a Bluetooth Low Energy (BLE) module 122, a controller 124, and others. The current sensor 120 may be an ampere meter, a volt meter, or any other sensor configured to sense load variations occurring due to inductive coupling between the PTU 102 and another object, such as the PRU 104. The current sensor 120 may provide an indication of load change to the controller 124 of the PTU 102. A load change may be detected and used as an indication that an object has been placed in the vicinity of the transmit coil, such as a device to be charged or a foreign object.

The controller 124 can be configured to control various aspects of the operation of the PTU 102. For example, the controller 124 can set a frequency, and/or power level of the power radiated by the transmit coil 106. The controller 124 can also control communications between the PTU 102 and the PRU 104 through the BLE module 122.

The PRU 104 may be a component of a computing device 126 configured to receive power from the PTU 102 wirelessly by the inductive coupling 110. The computing device 126 may be any suitable type of computing device, including a laptop computer, an Ultrabook, a tablet computer, a phablet, a mobile phone, smart phone, smart watch, and other types of mobile battery-powered devices.

The PRU 104 can include a rectifier 128, a DC2DC converter 130, a battery charger 132, and a battery 134. The computing device 126 receives electrical power as a magnetic flux associated with the inductive coupling that passes through the receive coil 108. The rectifier 128 receives an alternating current (AC) voltage from the receive coil 108 and generates a rectified DC voltage (Vrect). The DC2DC converter 130 receives the rectified voltage from the rectifier 128, converts the voltage to a suitable voltage level, and provides the output to the battery charger 132. The battery 134 powers the various platform hardware of the computing device 126. The platform hardware includes the processors, working memory, data storage devices, communication buses, I/O interfaces, communication devices, display devices, and other components that make up the computing device 126.

The PRU 104 may also include a Bluetooth Low Energy (BLE) module 136 and a controller 138. The controller 138 is configured to perform a wireless handshake with the PTU 102. As discussed above, the wireless handshake broadcast may be performed through the BLE modules 122 and 136 or other wireless data transmission component. Various types of information may be transmitted during the wireless handshake, including power budget, wireless charging capabilities, size of the computing device 126, and other information.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

Figure 2:
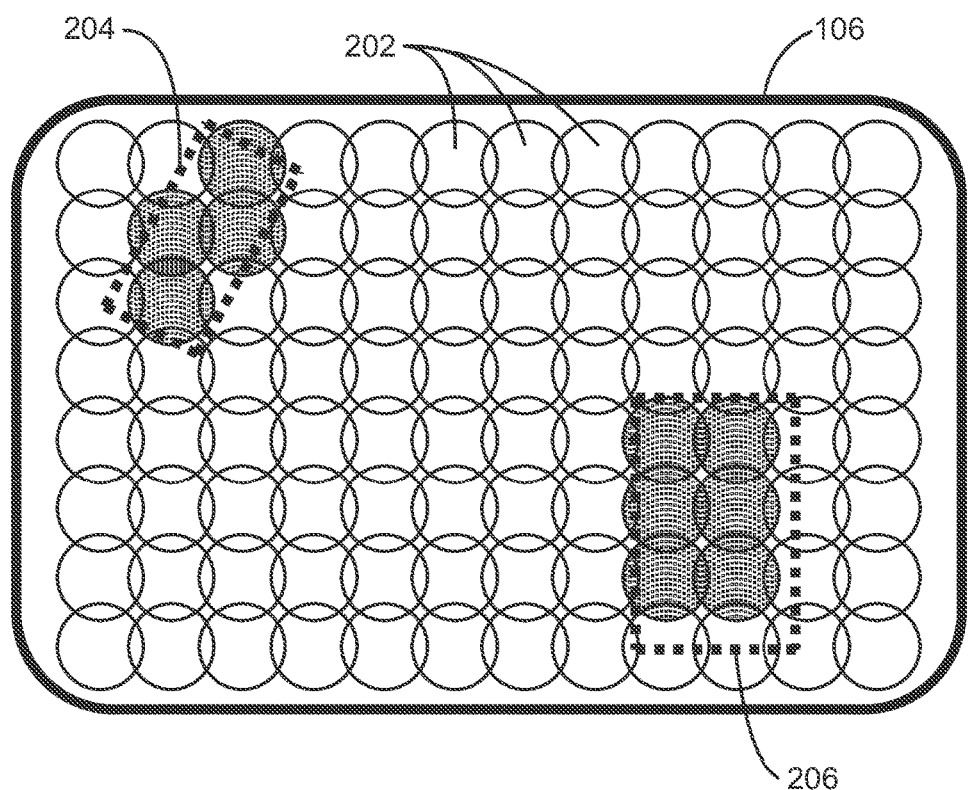
FIG. 2 is an illustration of one example of a transmit coil array.

FIG. 2 is an illustration of one example of a transmit coil array 106. The transmit coil array 106 includes a plurality of transmit coils, referred to herein as coil elements 202. Each coil element 202 may be activated individually, depending on whether a compatible power receiving unit has been detected for each particular coil element 202. For example, FIG. 2 shows two power receiving units placed over the transmit coil array 106. The outlines 204 and 206 represent the outlines of the power receiving units, and the shading is used to represent those coil elements 202 that have been activated in response to the presence of the power receiving units. As shown in FIG. 2, only those coil elements that can have a significant effect on the power received by the power receiving device are activated, while the remaining coil elements 202 remain deactivated.

Each transmit coil element 202 is tuned to the same resonant frequency. In some examples, each coil element 202 will overlap the neighboring coil elements 202 to some degree. Each coil element 202 may be modeled after a single coil element design intended minimize the mutual coupling between neighboring coil elements. Therefore, each coil element 202 may be nearly identical (within manufacturing tolerances). The spacing of the coil elements is selected to coincide with the coil element's zero points. A zero point is a spacing between coil elements that results in zero mutual coupling. The coil elements 202 shown in FIG. 2 can include multiple zero points to further reduce mutual coupling between coil elements at various distances form one another. An example of a coil element 202 is shown in FIG. 3.

Figure 3:
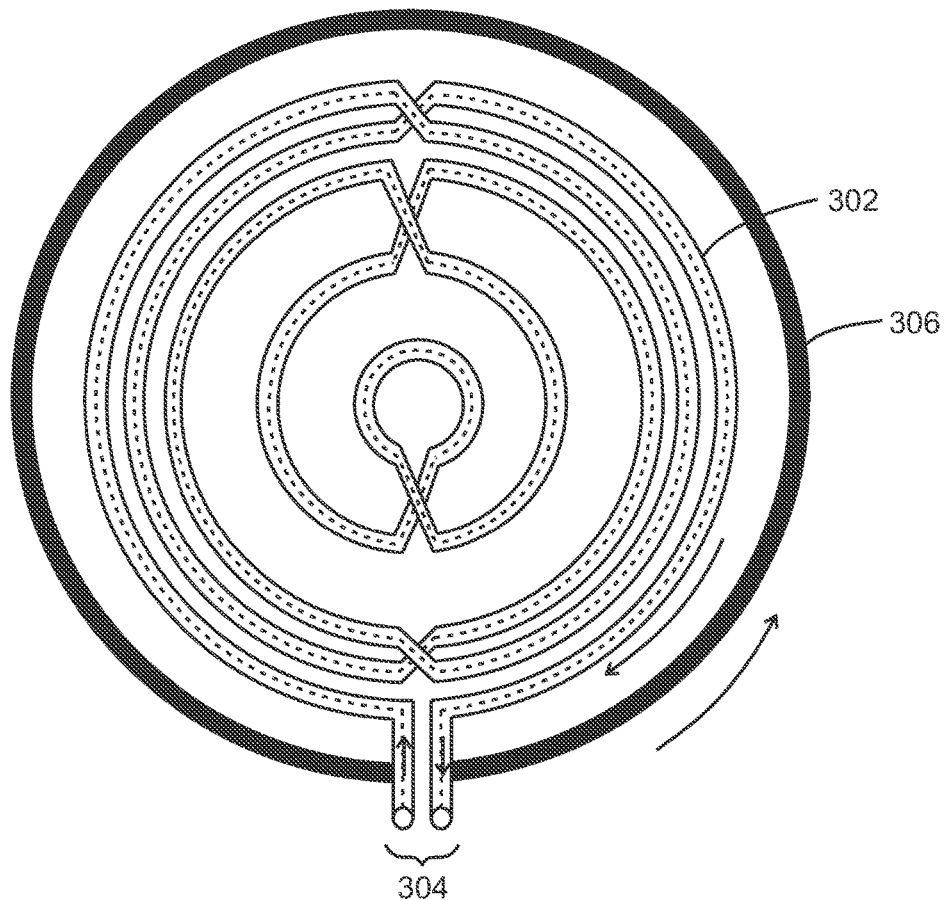
FIG. 3 is an example of a coil element that may be used in the transmit coil array of FIGS. 1 and 2.

FIG. 3 is an example of a coil element that may be used in the transmit coil array 106 of FIGS. 1 and 2. The coil element includes a primary coil 302, which is coupled to the power generating circuitry of the PTU through the terminals 304. The primary coil 302 receives current through the terminals 304 from the PTU and generates the magnetic field for wireless charging. The primary coil 302 includes one or more windings of an electrical conductor. The primary coil shown in FIG. 3 includes five windings. However, the primary coil 302 can have any suitable number of windings, including one.

In relation to the coil element 202, there is a defined area referred to herein as the active charging area. The active charging area is where PRUs 104 are to be placed so that the coil element 202 will be activated and begin generating an oscillating magnetic field to charge the PRU 104. The magnetic field may be maintained at a uniform and strong level within the active charging area. Outside the charging area, the magnetic field weakens with distance. In some examples, the active charging area will be approximately equal to the area bounded by the primary coil 302. The number of windings and the spacing between the windings may be selected, in part, to create a uniform magnetic field are within the active charging area.

The example coil element 202 of FIG. 3 can also include a shield winding 306 which surrounds the primary coil 302. The shield winding 302 and the primary coil 302 are in approximately the same plane. One effect of the shield winding 306 may be to reduce the level of magnetic energy radiated outside of the active charging area. In some examples, the shield winding 306 may be divided into segments separated by capacitors. This can be done to suppress the wavelength effect and thereby restore the current uniformity at a desired operating frequency.

The shield winding 306 may be passive or active. In a passive shield winding, the shield winding is not actively driven by the PTU circuitry or any other conductively coupled current source. Rather, the passive shield winding couples a portion of the magnetic energy radiated by the primary coil 302, resulting in a reactive current on the shield winding 306.

In an active shield winding, the shield winding is conductively coupled to and driven by the PTU circuitry. Thus, the active shield turn 306 conductively couples a portion of the current being driven by the PTU circuitry. The coupling of energy from the PTU circuitry to the shield coil 306 can be adjusted by coupling the shield coil 306 to the PTU circuitry through circuit elements such as resistors, capacitors, inductors, and the like.

The current in the shield winding 306 is approximately 180 degrees out of phase with the current in the primary coil 302. Thus, the current in the shield winding 306 is driven by the PTU circuitry in an opposite direction compared to the current in the primary coil 302. If the current is in the clockwise direction in the primary coil 302, the current in the shield winding 306 flows in an anti-clockwise direction and vice versa. In this way, the magnetic field generated by the shield winding 306 cancels the magnetic field produced by the primary coil 302. In the active charging area, the magnetic field generated by the shield winding 306 is small compared to the magnetic field provided by the primary winding. However, outside of the active charging area, the magnetic field generated by the shield winding is strong enough to at least partially cancel the magnetic field generated by the primary windings. Thus, the active shield winding preserves the useful magnetic field in the active charging area but tends to cancel the detrimental magnetic field outside of the active charging area.

Another effect of the design of the coil element 202 is to create additional zero points. As stated above, a zero point is a spacing between coil elements that results in zero mutual coupling. Typical transmit coils exhibit a single zero point. However, as shown in FIG. 4, the coil element 202 shown in FIG. 3 comprises multiple zero points.

The geometry and other characteristics of the coil element 202 may be adjusted to manipulate the number of zero points and the distances at which the zero points manifest. Adjustable features include the number of windings of the primary coil 302, the spacing between the windings, the gap between the outer winding of the primary coil 302 and the shield winding 306, and whether the shield winding is active or passive, and others. The characteristics of the coil element 202 may be determined experimentally or through computer simulation.

It will be appreciated that the coil element 202 shown in FIG. 3 represents one example of a coil element that can be used in the transmit coil array 106. For example, the primary coil 302 and the shield winding 304 may be shapes other than circular. Furthermore, it will also be appreciated that the simplified illustration shown in FIG. 3 is not drawn to scale.

Figure 4:
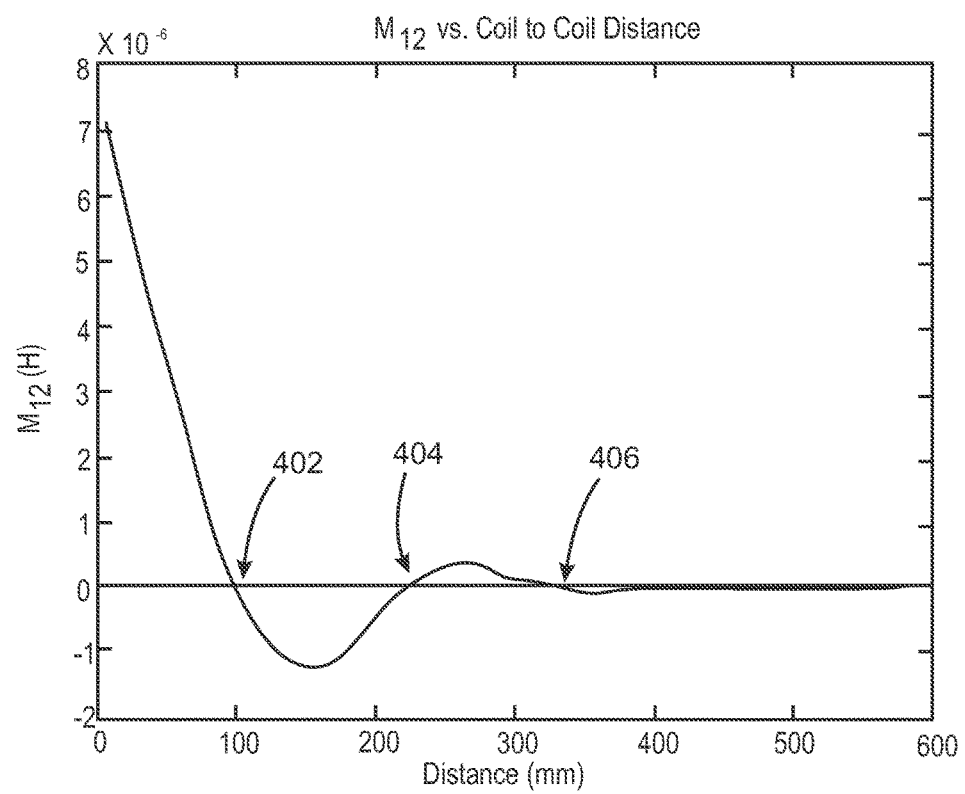
FIG. 4 is a graph showing the zero points for a coil element such as the example coil element of FIG. 3.

FIG. 4 is a graph showing the zero points for a coil element such as the example coil element of FIG. 3. The graph 400 is a plot of mutual coupling between two coils ($M_{12}$) at various distances. The results in the graph 400 were determined experimentally by measuring the actual coupling $M_{12}$ from one coil element to another as the distance between the coil elements was adjusted. The distances were measured from center of coil element to center of coil element.

As shown in FIG. 4, there are three zero points 402, 404, and 406. Zero point 402 occurs at approximately 100 millimeters (mm), zero point 404 occurs at approximately 220 mm and zero point 406 occurs at approximately 330 mm. In a tiled transmit coil array, if the spacing between the coil elements 202 matches the coil separation distances of the zero points, the mutual coupling between coils of the array can be reduced. An example of such a tiled transmit coil array is shown in FIG. 5

It will be appreciated that the graph of FIG. 4 shows mutual coupling characteristics for one example coil element 202. By controlling the characteristics of the coil element 202, each of the zero points can be shifted toward smaller or greater distances. Furthermore, the coil element can also be designed to exhibit fewer or more zero points, including 2, 4, or more.

Figure 5:
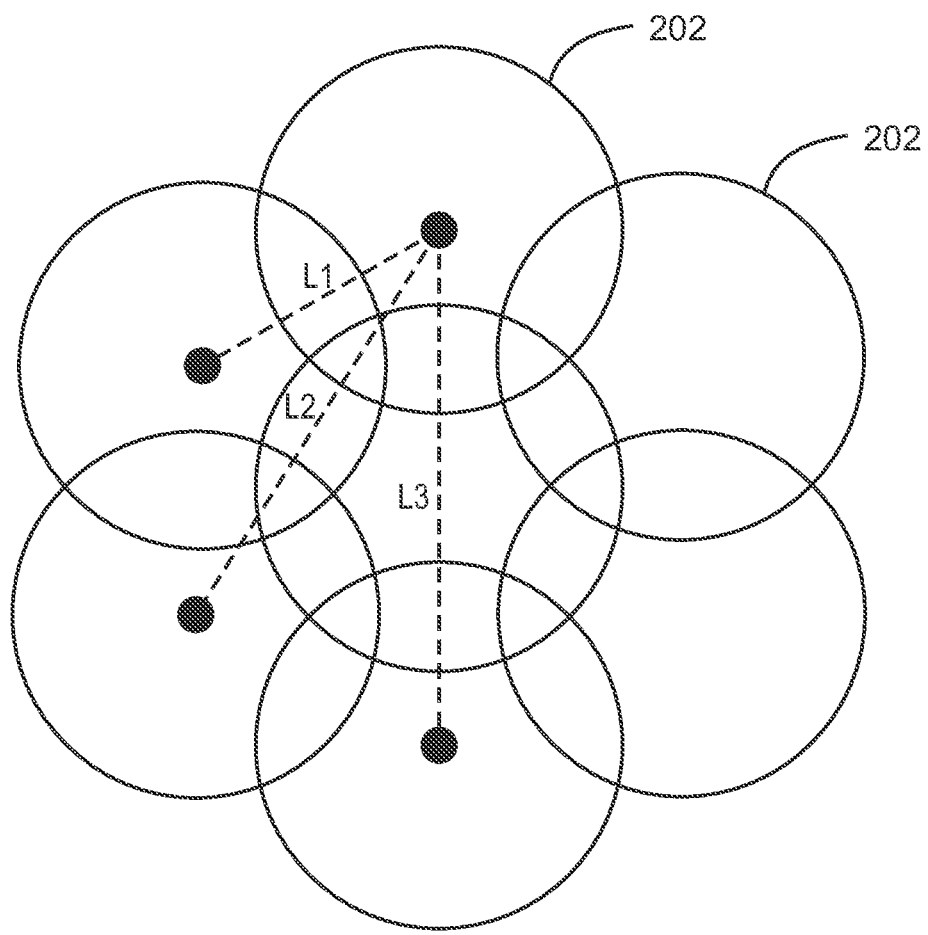
FIG. 5 is an example of a transmit coil array wherein the spacing between the coils is specified based on the zero points of each coil element.

FIG. 5 is an example of a transmit coil array wherein the spacing between the coil elements is specified based on the zero points of each coil element. For the sake of clarity, the coil elements 202 are shown simply as circles. However, each coil element 202 will have a plurality of windings arranged in a specified pattern, like the example coil element shown in FIG. 3.

As shown in FIG. 5, the coil elements 202 are arranged in an overlapping hexagonal pattern. The hexagonal pattern results in three different coil separation distances, labeled L1, L2, and L3. In other words, the center-to-center spacing distance between any two of the coil elements 202 will be equal to L1, L2, or L3. In the example shown in FIG. 5, the ratio between these distances will be $1:\sqrt{3}:2$. Each of the coil elements 202 is designed to exhibit zero mutual coupling at each of those three distances. With reference to FIG. 4, distance L1 corresponds with zero point 402, distance L2 corresponds with zero point 404, and distance L3 corresponds with zero point 406. In this way, the coupling between any of the coil elements 202 is approximately zero even though each coil element 202 is configured to resonate at the same resonant frequency.

The tiled transmit coil array 106 (FIG. 2) may include 7 coil elements arranged in the pattern shown in FIG. 5. Additionally, as shown in FIG. 6, the pattern of coil elements 202 shown in FIG. 5 can be scaled to create a transmit coil array 106 with additional coil elements 202.

Figure 6:
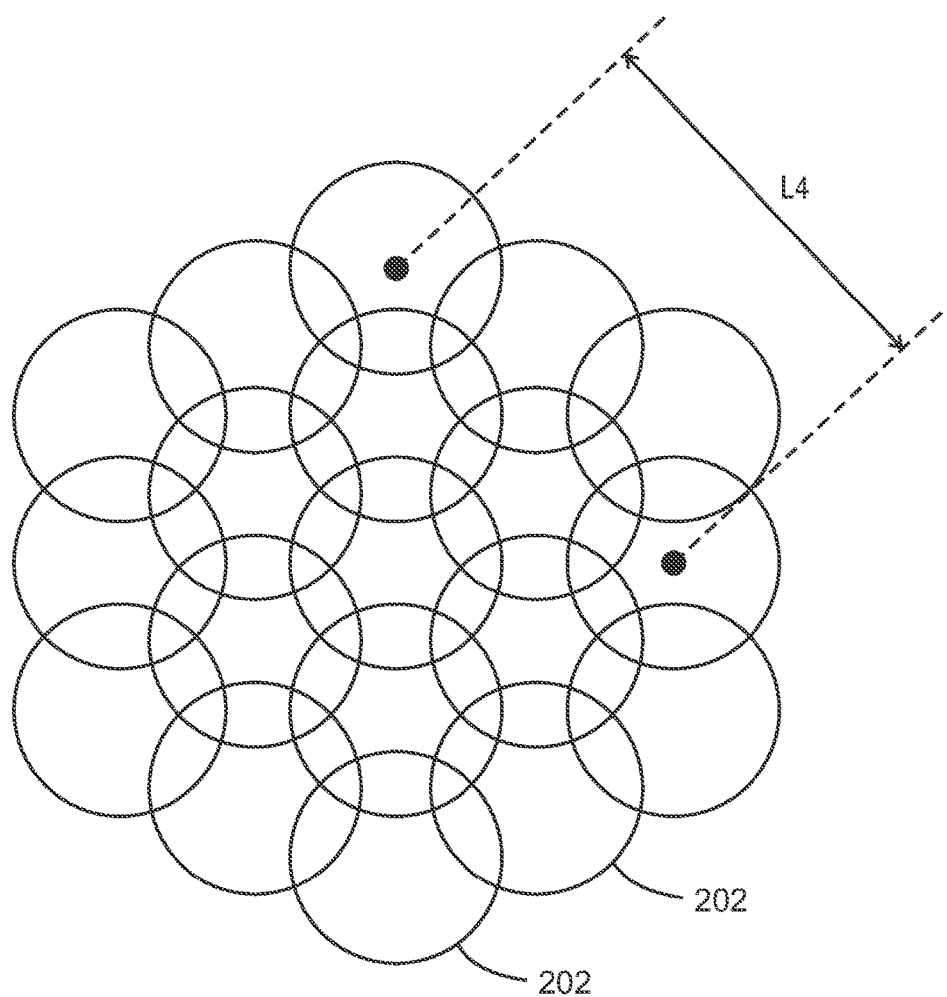
FIG. 6 shows a transmit coil array with overlapping hexagonal coil element patterns.

FIG. 6 shows a transmit coil array with overlapping hexagonal coil element patterns. Each individual coil element 202 is arranged in a hexagonal pattern with each of its nearest neighboring coil elements 202. Thus, the center coil element 202 can be considered to be one of seven different hexagons. As explained above, the distances between any two coil elements 202 of a hexagon correspond with a zero point of the coil element 202. Accordingly, it can be seen that the center coil element has zero coupling with all 18 outer coil elements.

In the particular arrangement shown in FIG. 6, not all of the coil elements 202 fit within a hexagonal relationship. For example, the distance labeled L4 identifies two coil elements 202 that are not in a hexagonal relationship. In some examples, the distance L4 does correspond with a zero point of the coil element. However, the distance L4 may me great enough that the mutual coupling between the two close to zero. In some examples, the coil element 202 may be arranged so that a forth zero point is exhibited at distance L4.

The transmit coil array in FIG. 6 can be scaled to any suitable size and number of coil elements. As additional coil elements 202 are added, the possibility that two coil elements are not within each other's zero points will increase.

However, the greater distance between such coil elements will keep the mutual coupling between them low.

Figure 7:
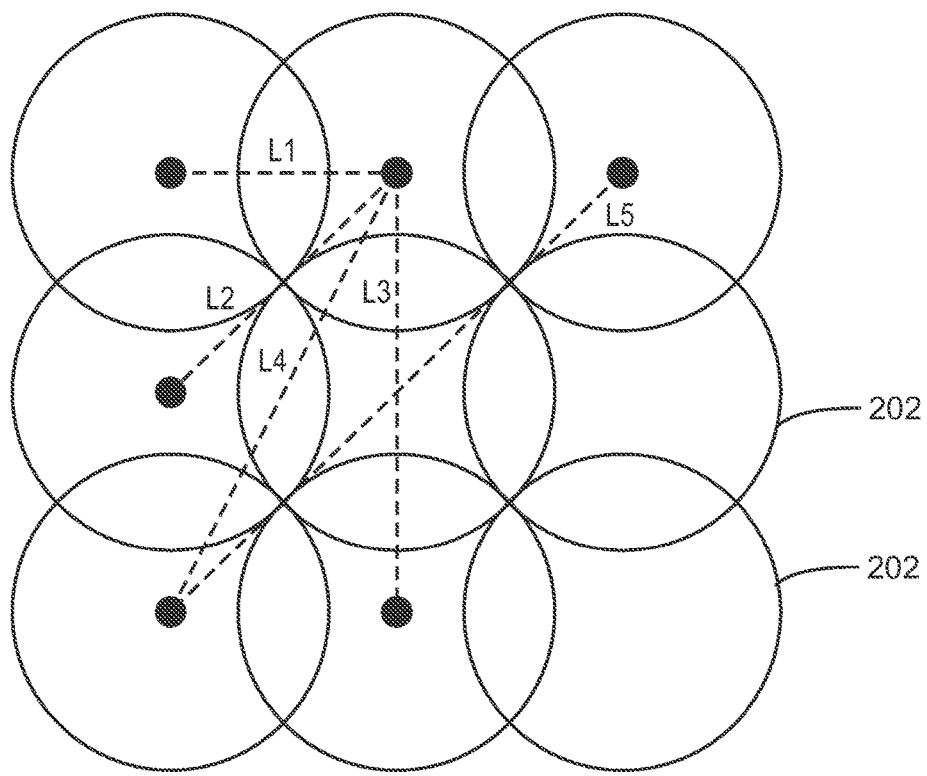
FIG. 7 is another example of a transmit coil array wherein the spacing between the coils elements corresponds with the zero points of each coil element.

FIG. 7 is another example of a transmit coil array wherein the spacing between the coils elements corresponds with the zero points of each coil element. As shown in FIG. 7, the coil elements 202 are arranged in an overlapping rectangular pattern. The rectangular pattern results in five different center-to-center coil separation distances, labeled L1, L2, L3, L4, and L5.

Each of the coil elements 202 may be designed to exhibit zero mutual coupling at one or more of the three distances. In one example, the distances L1 and L2 correspond with zero points, while the distances L3, L4, and L5 do not correspond with zero points. In another example, the distances L1, L2, and L3 correspond with zero points, while the distances L4 and L5 do not correspond with zero points. In another example, the distances L1, L2, L3, and L4 correspond with zero points, while the distance L5 does not correspond with a zero point. In another example, all five distances correspond with different zero points.

The transmit coil array 106 (FIG. 2) may include nine coil elements arranged in the pattern shown in FIG. 7. Additionally, as shown in FIG. 8, the pattern of coil elements 202 shown in FIG. 7 can be scaled to create a transmit coil array 106 of any suitable size and number of coil elements.

Figure 8:
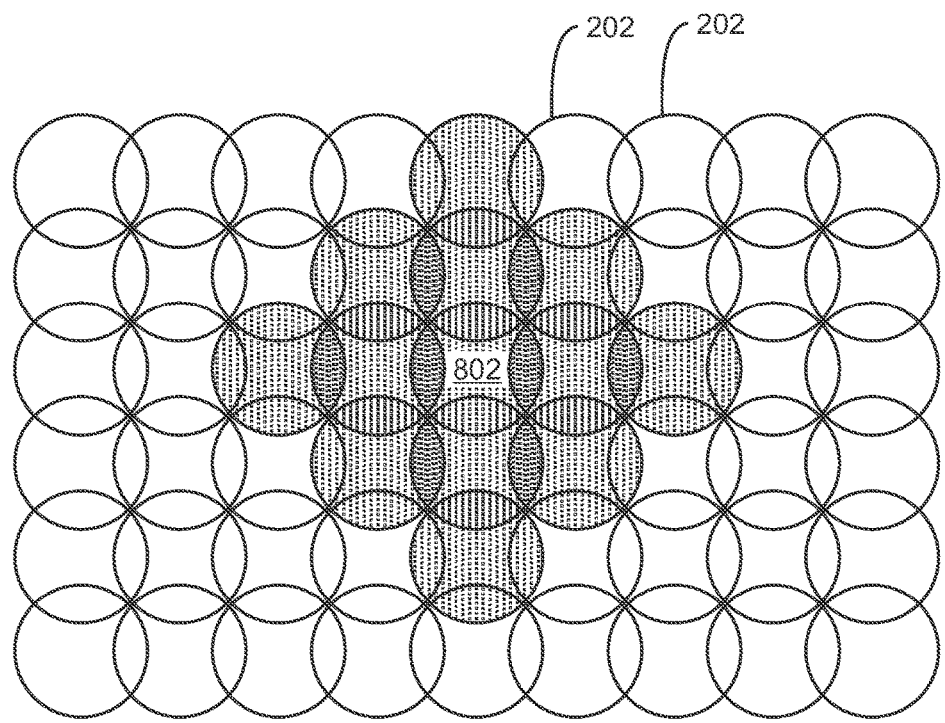
FIG. 8 shows a transmit coil array with overlapping rectangular coil element patterns.

FIG. 8 shows a transmit coil array with overlapping rectangular coil element patterns. Each individual coil element 202 is arranged in a rectangular pattern with each of its nearest neighboring coil elements 202. A certain number of coil elements within a group of neighboring coil elements will exhibit zero mutual coupling depending on the number of zero points exhibited by the coil element 202. For example, assuming a total of three zero points corresponding with L1, L2, and L3 of FIG. 7, the shaded group of coil elements 202 represents all of the surrounding coil elements that will exhibit zero mutual coupling with coil element 802. Any coil elements outside the shaded area may have a small level of mutual coupling that is relatively low due to the large distance between them. An even greater number of coil elements can be included in the group of coil elements with zero mutual coupling if the coil elements exhibit a fourth zero point at distance L4.

Figure 9:
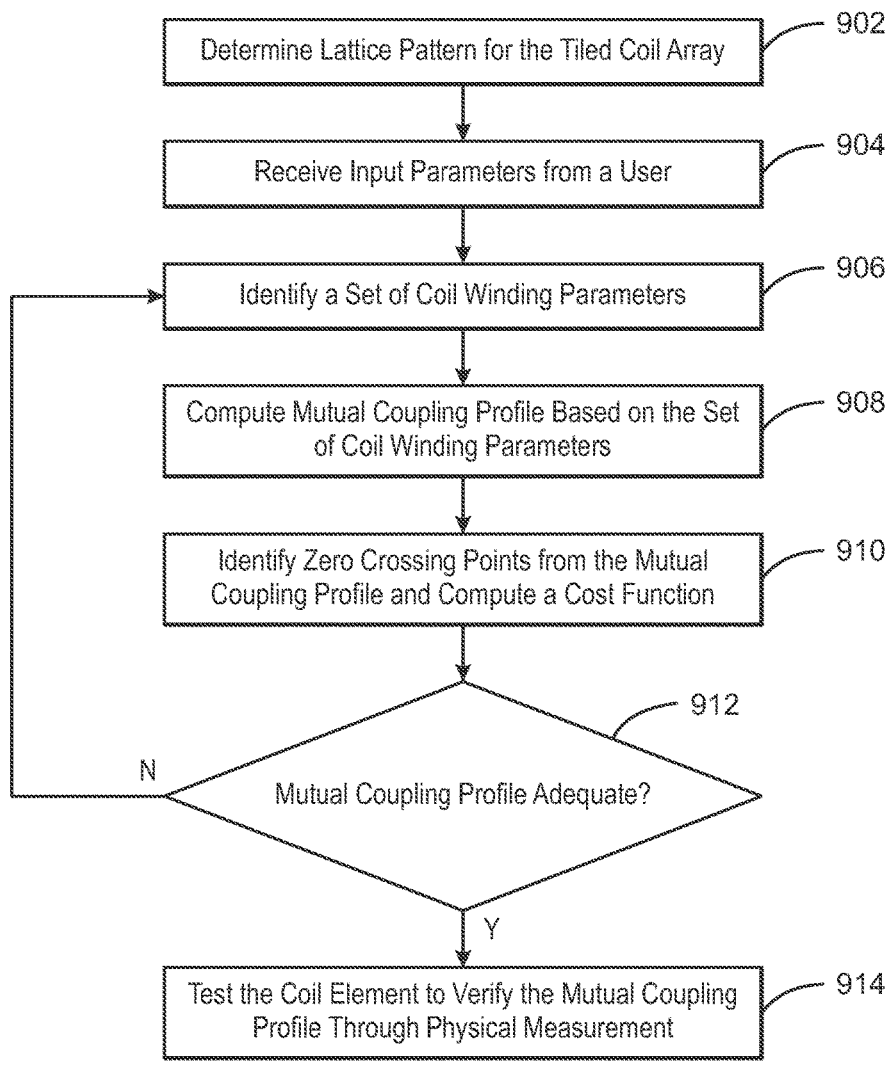
FIG. 9 is a process flow diagram of a method of manufacturing a transmit coil array for a magnetic resonance-type wireless power transmitter.

FIG. 9 is a process flow diagram of a method of manufacturing a transmit coil array for a magnetic resonance-type wireless power transmitter. The method 900 is an iterative process by which suitable dimensions can be obtained for windings of the primary coil and the shield winding. The method may begin at block 902.

At block 902, a lattice pattern can be determined for the transmit coil array. For example, the lattice pattern may be selected by the user to be hexagonal, rectangular, octagonal, or any other suitable pattern.

At block 904, input parameters are specified by a user. The input parameters can include a number of signature distances and a range of coil winding parameters. The signature distances are those distance at which a zero point is desired for the coil element. The signature distances will be based on the center-to-center spacing between the neighboring coil elements and the number of zero points specified. The coil winding parameters may be characterized, for example, by specifying the number of windings and a range of radii for each of the windings, including the primary coil and the shield winding. The coil winding parameters can also include a radius step size. The signature distances and coil winding parameters are used as input to a search algorithm that searches for the coil winding distribution that generates a desired mutual coupling profile. The search algorithm iterates through several coil winding layouts in search for a mutual coupling profile with the desired signature distances.

At block 906, a set of coil winding parameters are identified. The identified coil winding parameters are parameters within the range specified by the user that can be used to model an actual coil element.

At block 908, mutual coupling profile is computed based on the set of coil winding parameters. The mutual coupling profile is generated by sweeping the coil to coil distance and calculating the mutual coupling for the coil element at each step. The mutual coupling profile may be computed as the mutual inductance versus the coil to coil distances. The mutual inductance, $M_{ij}$, at each distance step may be computed using the following formula.

$$M_{ij} = \frac{\mu_0}{4\pi I_i I_j} \int_{C_i} d^3 x_i \int_{C_j} d^3 x_j \cdot \frac{J(x_i) \cdot J(x_j)}{|x_i - x_j|} = \frac{1}{I_j} \oint_{C_i} A_{ij} \cdot dl$$

Each coil winding may be divided into small straight elements and the vector potential for each line element computed. The mutual coupling $Z_{21}$ is directly proportional to the mutual inductance, M, between any two coil units. The mutual inductance can be calculated by the line integral of the vector potential by one coil unit along the path of the other coil windings.

At block 910, zero crossing points are identified from the mutual coupling profile and a cost function is computed. In some examples, the search algorithm may be configured to minimize the cost function, F, shown below.

$$F = \sum_j^N (dj - Dj)^2$$

In the above equation, dj are the zero coupling positions found in each iteration, Dj are the signature zero coupling positions desired for padding the array into a specific pattern e.g. hexagonal, rectangular, octagonal, or any other suitable pattern.

At block 912, the mutual coupling profile is evaluated. The criteria for determining the effectiveness of the mutual coupling profile can include determining whether the profile comprises zero points at the signature distances. If the mutual coupling profile is inadequate, the process flow may return to block 906, wherein new parameters will be selected for the cost function minimization process. If the mutual coupling profile is determined to be adequate, the process flow may advance to block 914.

At block 914, the coil element can be tested to verify the mutual coupling profile through physical measurement. If the shielding turn is determined to be effective, the method 900 ends. Testing the coil element can include building a physical test setup according to the last set of coil winding parameters identified at block 906. The test set up can include two coils fabricated according to the identified coil winding parameters. To verify the mutual coupling profile, the center-to-center distance between the coil elements can be varied and the mutual inductance between the coils can be measured at various distances.

In some cases, depending on the circumference of the shield winding relative to the wavelength, the current may be non-uniform along the shield winding due to the wavelength effect. If the optimization of the shield winding is based on an assumption of current uniformity assumption for fast calculation, the calculation accuracy may be compromised by the wavelength effect. To mitigate the wavelength effect, capacitors can be adding to the shield winding to effectively separate the shield winding into multiple segments, with each segment resonating by itself. Reducing the wavelength effect enables the current to flow more uniformly along the shield winding.

The method 900 should not be interpreted as meaning that the blocks are necessarily performed in the order shown. Furthermore, fewer or greater actions can be included in the method 900 depending on the design considerations of a particular implementation. The method may be implemented as instructions stored on the tangible non-transitory machine-readable medium, which may be read and executed by a processor.

EXAMPLES

Example 1 is a power transmitting unit. The power transmitting unit includes a magnetic resonance-type transmit coil array comprising a plurality of coil elements, wherein each coil element is tuned to a same resonant frequency; and a power generating circuitry to deliver current to the transmit coil array to wirelessly power a device within an active wireless charging area of at least one of the plurality of coil elements; wherein each coil element exhibits a plurality of zero point distances and the spacing between neighboring coil elements corresponds with the plurality of zero point distances.

Example 2 includes the power transmitting unit of example 1, including or excluding optional features. In this example, each coil element comprises a primary coil and a shield winding, wherein the primary coil comprises one or more windings.

Example 3 includes the power transmitting unit of any one of examples 1 to 2, including or excluding optional features. In this example, the shield winding comprises a conductive ring that concentrically surrounds the primary coil.

Example 4 includes the power transmitting unit of any one of examples 1 to 3, including or excluding optional features. In this example, the shield winding is conductively coupled to the primary coil and receives current from the power generating circuitry.

Example 5 includes the power transmitting unit of any one of examples 1 to 4, including or excluding optional features. In this example, the primary coil and the shield winding comprise a plurality of capacitors that separate the primary coil and the shield winding into a plurality of resonant segments.

Example 6 includes the power transmitting unit of any one of examples 1 to 5, including or excluding optional features. In this example, the primary coil comprises a plurality of primary windings that are driven by the power generating circuitry.

Example 7 includes the power transmitting unit of any one of examples 1 to 6, including or excluding optional features. In this example, current in the primary coil is approximately 180 degrees out of phase with current in the shield winding.

Example 8 includes the power transmitting unit of any one of examples 1 to 7, including or excluding optional features. In this example, each coil element is to exhibit three zero point distances.

Example 9 includes the power transmitting unit of any one of examples 1 to 8, including or excluding optional features. In this example, the plurality of coil elements are arranged in a hexagonal pattern, wherein a distance between any two coil elements of a hexagon is equal to one of the plurality of zero point distances.

Example 10 includes the power transmitting unit of any one of examples 1 to 9, including or excluding optional features. In this example, the plurality of coil elements are arranged in a rectangular pattern, wherein a distance between any two adjacent or overlapping coil elements is equal to one of the plurality of zero point distances.

Example 11 is a method of manufacturing a power transmitting unit. The method includes forming a plurality of coil elements, wherein each coil element exhibits a plurality of zero point distances; disposing the plurality of coil elements in an overlapping pattern to form a magnetic resonance-type transmit coil array, wherein each coil element is tuned to a same resonant frequency and the spacing between neighboring coil elements corresponds with the plurality of zero point distances; and conductively coupling a power generating circuitry to the transmit coil array, the power generating circuitry to wirelessly power a device within an active wireless charging area of at least one of the plurality of coil elements.

Example 12 includes the method of example 11, including or excluding optional features. In this example, forming each coil element comprises forming a primary coil and forming a shield winding around the primary coil.

Example 13 includes the method of any one of examples 11 to 12, including or excluding optional features. In this example, forming the shield winding comprises forming a conductive ring that concentrically surrounds the primary coil.

Example 14 includes the method of any one of examples 11 to 13, including or excluding optional features. In this example, forming each coil element comprises conductively coupling the shield winding to the primary coil.

Example 15 includes the method of any one of examples 11 to 14, including or excluding optional features. In this example, forming each coil element comprises separating the shield winding into a plurality of resonant segments coupled together by capacitors and separating the primary coil into a plurality of resonant segments coupled together by capacitors.

Example 16 includes the method of any one of examples 11 to 15, including or excluding optional features. In this example, forming the primary coil comprises forming a plurality of primary windings that are configured to be driven by the power generating circuitry.

Example 17 includes the method of any one of examples 11 to 16, including or excluding optional features. In this example, current in the primary coil is approximately 180 degrees out of phase with current in the shield winding.

Example 18 includes the method of any one of examples 11 to 17, including or excluding optional features. In this example, each coil element is to exhibit three zero point distances.

Example 19 includes the method of any one of examples 11 to 18, including or excluding optional features. In this example, disposing the plurality of coil elements in an overlapping pattern comprises arranging the plurality of coil elements in a hexagonal pattern, wherein a distance between any two coil elements of a hexagon is equal to one of the plurality of zero point distances.

Example 20 includes the method of any one of examples 11 to 19, including or excluding optional features. In this example, disposing the plurality of coil elements in an overlapping pattern comprises arranging the plurality of coil elements in a rectangular pattern, wherein a distance between any two adjacent or overlapping coil elements is equal to one of the plurality of zero point distances.

Example 21 is a transmit coil array to wirelessly transmit power to a receiving device. The device includes a plurality of coil elements arranged in an overlapping pattern to form a magnetic resonance-type transmit coil array, wherein each coil element exhibits a plurality of zero point distances, and the spacing between neighboring coil elements corresponds with the plurality of zero point distances.

Example 22 includes the device of example 21, including or excluding optional features. In this example, each coil element comprises a primary coil and a shield winding, wherein the primary coil comprises one or more windings.

Example 23 includes the device of any one of examples 21 to 22, including or excluding optional features. In this example, the shield winding comprises a conductive ring that concentrically surrounds the primary coil.

Example 24 includes the device of any one of examples 21 to 23, including or excluding optional features. In this example, the shield winding is conductively coupled to the primary coil and receives current from the power generating circuitry.

Example 25 includes the device of any one of examples 21 to 24, including or excluding optional features. In this example, the primary coil and the shield winding comprise a plurality of capacitors that separate the primary coil and the shield winding into a plurality of resonant segments.

Example 26 includes the device of any one of examples 21 to 25, including or excluding optional features. In this example, the primary coil comprises a plurality of primary windings that are driven by the power generating circuitry.

Example 27 includes the device of any one of examples 21 to 26, including or excluding optional features. In this example, current in the primary coil is approximately 180 degrees out of phase with current in the shield winding.

Example 28 includes the device of any one of examples 21 to 27, including or excluding optional features. In this example, each coil element is to exhibit three zero point distances.

Example 29 includes the device of any one of examples 21 to 28, including or excluding optional features. In this example, the plurality of coil elements are arranged in a hexagonal pattern, wherein a distance between any two coil elements of a hexagon is equal to one of the plurality of zero point distances.

Example 30 includes the device of any one of examples 21 to 29, including or excluding optional features. In this example, the plurality of coil elements are arranged in a rectangular pattern, wherein a distance between any two adjacent or overlapping coil elements is equal to one of the plurality of zero point distances.

Example 31 is an apparatus for wirelessly transmitting power. The apparatus includes means for generating a magnetic field to wirelessly power a device; wherein the means for generating the magnetic field each exhibit a plurality of zero point distances and are arranged in an overlapping array wherein the spacing between the means for generating the magnetic field corresponds with the plurality of zero point distances; and means for delivering current to the array to wirelessly power a device.

Example 32 includes the apparatus of example 31, including or excluding optional features. In this example, the means for generating the magnetic field comprises a primary coil and a shield winding, wherein the primary coil comprises one or more windings.

Example 33 includes the apparatus of any one of examples 31 to 32, including or excluding optional features. In this example, the shield winding comprises a conductive ring that concentrically surrounds the primary coil.

Example 34 includes the apparatus of any one of examples 31 to 33, including or excluding optional features. In this example, the shield winding is conductively coupled to the primary coil and receives current from the means for delivering current to the array.

Example 35 includes the apparatus of any one of examples 31 to 34, including or excluding optional features. In this example, the primary coil and the shield winding comprise a plurality of capacitors that separate the primary coil and the shield winding into a plurality of resonant segments.

Example 36 includes the apparatus of any one of examples 31 to 35, including or excluding optional features. In this example, the primary coil comprises a plurality of primary windings that are driven by the means for delivering current to the array.

Example 37 includes the apparatus of any one of examples 31 to 36, including or excluding optional features. In this example, current in the primary coil is approximately 180 degrees out of phase with current in the shield winding.

Example 38 includes the apparatus of any one of examples 31 to 37, including or excluding optional features. In this example, means for generating a magnetic field exhibit three zero point distances.

Example 39 includes the apparatus of any one of examples 31 to 38, including or excluding optional features. In this example, the means for generating the magnetic field are arranged in a hexagonal pattern.

Example 40 includes the apparatus of any one of examples 31 to 39, including or excluding optional features. In this example, the means for generating the magnetic field are arranged in a rectangular pattern Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A power transmitting unit, comprising:
    a magnetic resonance-type transmit coil array comprising
        a plurality of coil elements, wherein each coil element is tuned to a same resonant frequency; and
        a power generating circuitry to deliver current to the transmit coil array to wirelessly power a device within an active wireless charging area of at least one of the plurality of coil elements;
    wherein each coil element comprises a plurality of zero point distances and the spacing between neighboring coil elements corresponds with the plurality of zero point distances.

2. The power transmitting unit of claim 1, wherein each coil element comprises a primary coil and a shield winding, wherein the primary coil comprises one or more windings.

3. The power transmitting unit of claim 2, wherein the shield winding comprises a conductive ring that concentrically surrounds the primary coil.

4. The power transmitting unit of claim 2, wherein the shield winding is conductively coupled to the primary coil and receives current from the power generating circuitry.

5. The power transmitting unit of claim 2, wherein the primary coil and the shield winding comprise a plurality of capacitors that separate the primary coil and the shield winding into a plurality of resonant segments.

6. The power transmitting unit of claim 2, wherein the primary coil comprises a plurality of primary windings that are driven by the power generating circuitry.

7. The power transmitting unit of claim 2, wherein the current in the primary coil is about 180 degrees out of phase with current in the shield winding.

8. The power transmitting unit of claim 1, wherein each coil element comprises at least three zero point distances.

9. The power transmitting unit of claim 1, wherein the plurality of coil elements are arranged in a hexagonal pattern, wherein a distance between any two coil elements of a hexagon is equal to one of the plurality of zero point distances.

10. The power transmitting unit of claim 1, wherein the plurality of coil elements are arranged in a rectangular pattern, wherein a distance between any two adjacent or overlapping coil elements is equal to one of the plurality of zero point distances.

11. A method of manufacturing a power transmitting unit, comprising:
    forming a plurality of coil elements, wherein each coil element comprises a plurality of zero point distances;
    disposing the plurality of coil elements in an overlapping pattern to form a magnetic resonance-type transmit coil array,
    tuning each coil element to a same resonant frequency,
    arranging the spacing between neighboring coil elements to correspond with the plurality of zero point distances; and
    conductively coupling a power generating circuitry to the transmit coil array to wirelessly power a device within an active wireless charging area of at least one of the plurality of coil elements.

12. The method of claim 11, wherein forming each coil element comprises forming a primary coil and forming a shield winding around the primary coil.

13. The method of claim 12, wherein forming the shield winding comprises forming a conductive ring that concentrically surrounds the primary coil.

14. The method of claim 12, wherein forming each coil element comprises conductively coupling the shield winding to the primary coil.

15. The method of claim 12, wherein forming each coil element comprises separating the shield winding into a plurality of resonant segments coupled together by capacitors and separating the primary coil into a plurality of resonant segments coupled together by capacitors.

16. The method of claim 12, wherein forming the primary coil comprises forming a plurality of primary windings that are configured to be driven by the power generating circuitry.

17. The power transmitting unit of claim 12, wherein the current in the primary coil is about 180 degrees out of phase with current in the shield winding.

18. The method of claim 11, wherein each coil element comprises at least three zero point distances.

19. The method of claim 11, wherein disposing the plurality of coil elements in an overlapping pattern comprises arranging the plurality of coil elements in a hexagonal pattern, wherein a distance between any two coil elements of a hexagon is equal to one of the plurality of zero point distances.

20. The method of claim 11, wherein disposing the plurality of coil elements in an overlapping pattern comprises arranging the plurality of coil elements in a rectangular pattern, wherein a distance between any two adjacent or overlapping coil elements is equal to one of the plurality of zero point distances.

21. A transmit coil array to wirelessly transmit power to a receiving device, comprising:
a plurality of coil elements arranged in an overlapping pattern to form a magnetic resonance-type transmit coil array, wherein each coil element exhibits a plurality of zero point distances, and the spacing between neighboring coil elements corresponds with the plurality of zero point distances.

22. The transmit coil array of claim 21, wherein each coil element comprises a primary coil and a shield winding, wherein the primary coil comprises one or more windings.

23. The transmit coil array of claim 22, wherein the shield winding comprises a conductive ring that concentrically surrounds the primary coil.

24. The transmit coil array of claim 22, wherein the shield winding is conductively coupled to the primary coil and receives current from the power generating circuitry.

25. The transmit coil array of claim 22, wherein the primary coil and the shield winding comprise a plurality of capacitors that separate the primary coil and the shield winding into a plurality of resonant segments.

* * * * *